United States Patent
Albertelli et al.

(10) Patent No.: US 7,051,937 B2
(45) Date of Patent: May 30, 2006

(54) SYSTEM AND METHOD FOR FAST BINARIZATION OF BAR CODES IN THE PRESENCE OF NOISE

(75) Inventors: Lawrence E. Albertelli, Owego, NY (US); David L. Ii, Owego, NY (US); Nina Kung, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 289 days.

(21) Appl. No.: 10/104,150

(22) Filed: Mar. 22, 2002

(65) Prior Publication Data
US 2003/0178490 A1    Sep. 25, 2003

(51) Int. Cl.
G02B 26/10    (2006.01)
(52) U.S. Cl. .......................... 235/462.25; 235/462.27; 235/462.29
(58) Field of Classification Search ........... 235/462.25, 235/462.1, 462.27, 462.15, 462.19, 462.29, 235/462.01
See application file for complete search history.

(56) References Cited

U.S. PATENT DOCUMENTS

| | | | | |
|---|---|---|---|---|
| 4,323,772 A | * | 4/1982 | Serge ................... | 235/462.19 |
| 4,561,022 A | * | 12/1985 | Bayer ................... | 348/622 |
| 4,777,357 A | | 10/1988 | Harada et al. .......... | 235/463 |
| 5,296,690 A | * | 3/1994 | Chandler et al. ....... | 235/462.1 |
| 5,367,578 A | | 11/1994 | Golem et al. .......... | 382/12 |
| 5,563,955 A | * | 10/1996 | Bass et al. ............ | 382/101 |
| 5,600,118 A | | 2/1997 | Sato et al. ............ | 235/462 |
| 5,661,288 A | * | 8/1997 | Keinath et al. ......... | 235/436 |
| 5,710,875 A | * | 1/1998 | Harashima et al. ...... | 345/419 |
| 5,756,981 A | * | 5/1998 | Roustaei et al. ....... | 235/462.42 |
| 5,805,740 A | | 9/1998 | Takagi et al. .......... | 382/257 |
| 5,864,129 A | * | 1/1999 | Boyd ................... | 235/462.27 |
| 5,877,486 A | * | 3/1999 | Maltsev et al. ......... | 235/462.15 |
| 5,969,325 A | | 10/1999 | Hecht et al. ........... | 235/462.16 |
| 5,979,768 A | * | 11/1999 | Koenck ................. | 235/470 |
| 6,508,405 B1 | * | 1/2003 | Tang et al. ............ | 235/462.25 |
| 6,556,313 B1 | * | 4/2003 | Chang et al. ........... | 358/1.9 |
| 2002/0118887 A1 | * | 8/2002 | Gindele ................ | 382/260 |
| 2002/0141003 A1 | * | 10/2002 | Chang et al. ........... | 358/518 |

FOREIGN PATENT DOCUMENTS

| | | |
|---|---|---|
| EP | 0996079 A1 | 4/2000 |
| EP | 1182604 A1 | 2/2002 |

OTHER PUBLICATIONS

V. Wu, R. Manmatha, "Document Image Clean Up and Binarization", available at http://citeseer.nj.nec.com/43792.html.

J. S. Lim, *Two Dimensional Signal and Image Processing*, ISBN 0-13-935322-4, pp. 476-490.

R. C. Gonzalez, P. Wintz, *Digital Image Processing*, ISBN 0-201-02597-3, 1977, pp. 337-344.

Ø.D. Trier and T. Taxt, "Evaluation of binarization methods for document images", available at http://citeseer.nj.nec.com/trier95evaluation.html, also a short version published in IEEE Transatcions on Pattern Analysis and Machine Intelligence, 17, pp. 312-315, 1995.

\* cited by examiner

*Primary Examiner*—Michael G. Lee
*Assistant Examiner*—Kumiko C. Koyama
(74) *Attorney, Agent, or Firm*—Burns & Levinson LLP; Jacob N. Erlich; Orlando Lopez

(57) ABSTRACT

A system and method to binarize the bar code image in the presence of noise in order to render bar codes more detectable in the presence of noise. The method of this invention includes the steps of applying a gradient detecting filter to the bar code image, obtaining a filtered image, and then, adaptively binarizing the bar code image utilizing the corresponding filtered image to obtain an adaptive threshold. A system that implements the method is also described.

26 Claims, 7 Drawing Sheets

SYSTEM AND METHOD FOR FAST BINARIZATION OF BAR CODES IN THE PRESENCE OF NOISE

BACKGROUND OF THE INVENTION

This invention relates generally to methods and system for binarizing bar codes, and, more particularly to binarizing bar codes in the presence of noise.

Bar code symbols, formed from bars that are typically rectangular in shape, are used in a variety of applications ranging from product identification to the sorting of mail. Various optical scanning systems have been developed for acquiring an image from a bar code symbol, see, for example, the system described in U.S. Pat. No. 5,969,325. Binarizing in OCR systems, as described by Wu and Manmatha (V. Wu, R. Manmatha, Document Image Clean Up and Binarization, available at http://citeseer.nj.nec.com/43792.html) is traditionally performed with a multi directional Global threshold method. Under such a binarization method, the results obtained when the bar code is obscured by noise can be difficult to decode.

Many difficulties are encountered in detecting bar codes in the presence of noise, such as the noise caused by ink smearing, when global binarization methods are used.

Several adaptive binarization methods have been proposed (see, for example, Ø. D. Trier and T. Taxt, Evaluation of binarization methods for document images, available at http://citeseer.nj.nec.com/trier95evaluation.html, also a short version published in IEEE Transaction on Pattern Analysis and Machine Intelligence, 17, pp. 312–315, 1995.). Such proposed adaptive binarization algorithms are in general complex, difficult to implement, and, therefore, have not seen widespread use.

SUMMARY OF THE INVENTION

In order to render bar codes more detectable in the presence of noise, the present invention discloses a system and method to binarize the bar code image in the presence of noise. The method of this invention comprises the steps of applying of a gradient detecting filter to the bar code image, obtaining a filtered image, and then, adaptively binarizing the bar code image utilizing the corresponding filtered image to obtain an adaptive threshold.

In one embodiment of this invention, the gradient detecting filter is a directional filter. (A directional filter is a filter that detects directional changes in an image.) In a specific embodiment, the directional filter is an edge detection filter such as a constant multiple of a Sobel filter.

The method of this invention can be implemented by a system comprising means for calculating the filtered image and means for determining the binarization. For example, a dedicated processor and supporting memory could be used to implement the method of this invention. In another embodiment, a digital signal processor or a general purpose processor and supporting memory could be used to implement the method of this invention. In still another embodiment, any of the previously described processor and memory systems could be used to implement the filtering operation and a dedicated binarization circuit could be used to implement the binarization operation.

For a better understanding of the present invention reference is made to the accompanying drawings and detailed description and its scope will be pointed out in the appended claims.

DETAILED DESCRIPTION OF THE PREFERRED EMBODIMENTS

A system and method for binarizing a bar code image in the presence of noise, that renders bar codes more detectable in the presence of noise, is disclosed.

Figure 1A:
FIG. 1A depicts an original bar code image under the presence of noise.
Figure 1B:
FIG. 1B depicts the binarized image obtained using a global binarization algorithm.
Figure 2A:
FIG. 2A depicts a second original bar code image under the presence of noise.
Figure 2B:
FIG. 2B depicts the binarized image, corresponding to second bar code image, using a global binarization algorithm.

In order to better understand the difficulties encountered in past attempts to apply global binarization methods as described above, reference is made to FIGS. 1A, 1B, 2A, and 2B of the drawings. More specifically, FIG. 1A depicts an original bar code image under the presence of noise. FIG. 1B depicts the binarized image obtained from the image of FIG. 1A using a global binarization algorithm. Similarly, FIG. 2A depicts another original bar code image under the presence of noise. FIG. 2B depicts the binarized image obtained from the image of FIG. 2A using a global binarization algorithm.

Figure 3:
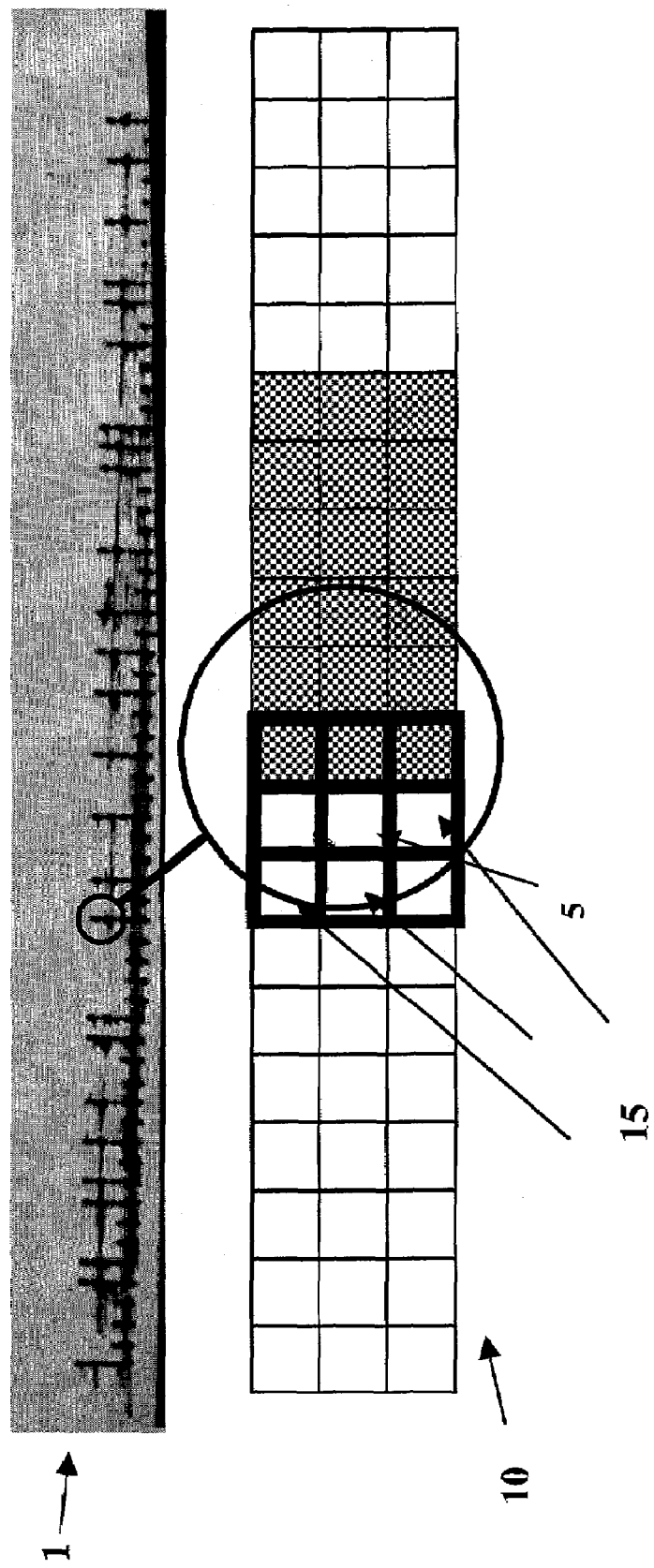
FIG. 3 is a graphical representation of the pixels from a bar code image, depicting the locations at which a filter as used in an embodiment of this invention is applied.

A graphical representation of the pixels from a bar code image 1, depicting the locations at which an embodiment of a filter as used in this invention is applied, is shown in FIG. 3. Referring to FIG. 3, for every point in the digitized image 10, there is a corresponding pixel value 5, $P_{i,j}$. Every pixel value 5, $P_{i,j}$, has a neighborhood of surrounding pixel values 15. Exceptions have to the made for the pixel values at the borders of the image. The methods for treating elements at the boundary are well known to those skilled in the art.

Figure 4:
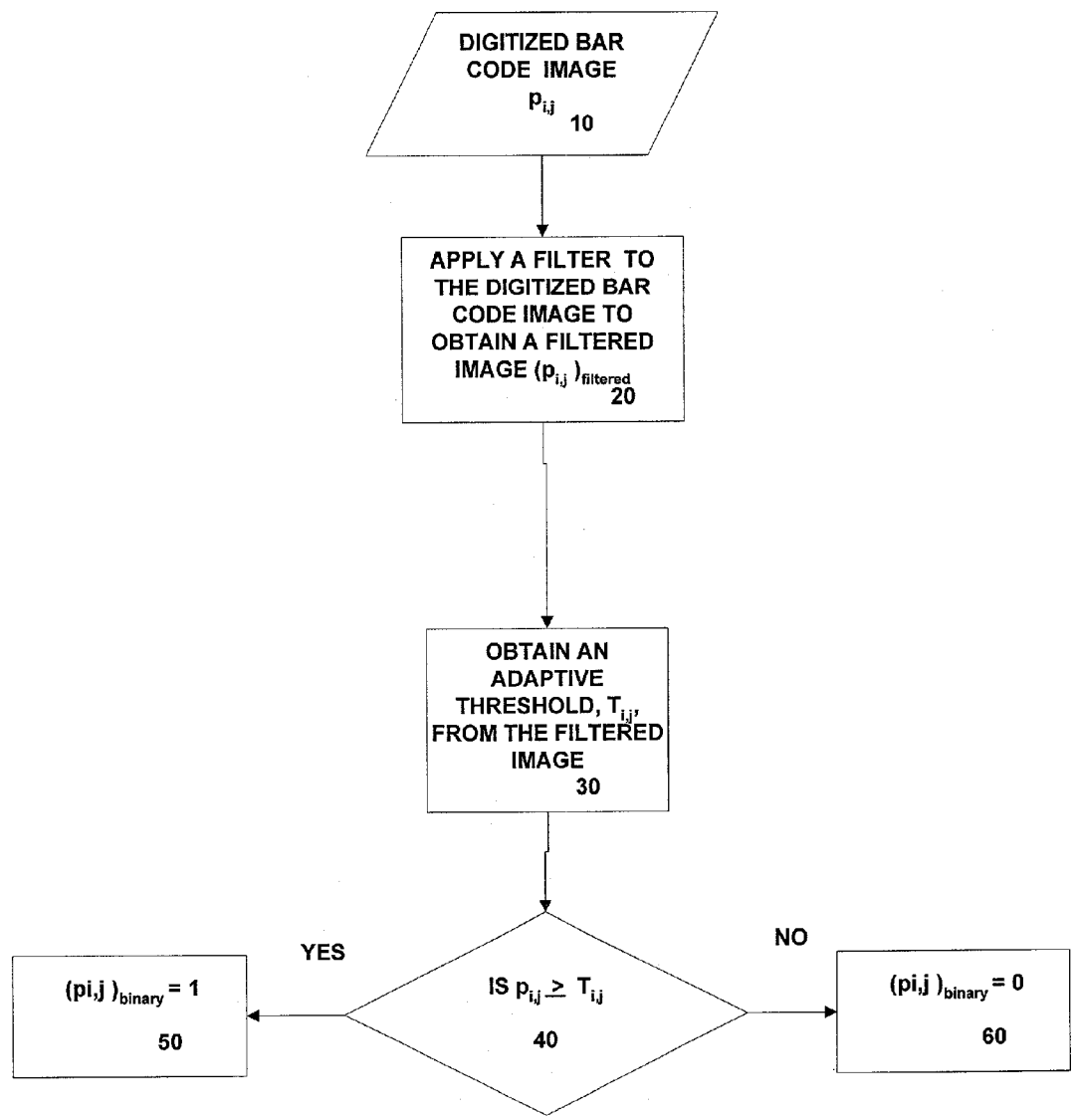
FIG. 4 is a flow chart representative of an embodiment of the method of this invention.

A flow chart representative of an embodiment of the method of this invention is shown in FIG. 4. Referring to FIG. 4, a gradient detecting filter is applied to each pixel value 5, $P_{i,j}$, and to surrounding pixels 15 of the digitized bar code image (step 20, FIG. 4). (Exemplary embodiments of gradient detecting filters are the filters described in J. S. Lim, *Two Dimensional Signal and Image Processing*, ISBN 0-13-935322-4, pp. 476–90 and in R. C. Gonzalez, P. Wintz, *Digital Image Processing*, ISBN 0-201-02597-3, 1977, pp. 337–44.) A filtered image, $(P_{i,j})_{filtered}$, is obtained by applying the gradient detecting filter to the digitized bar code image 10. If the gradient detecting filter is given a by $h_{i,j}$, where the index j extends from −n to +n, and, similarly, the index i extends from −n to +n, the filtered image pixel values are given by $$(p_{i,j})_{filtered} = \sum_{k=-n}^{n} \sum_{l=-n}^{n} h_{k+n,l+n} \, p_{i+k,j+l}$$

Using the filtered image pixel values, an adaptive threshold, $T_{i,j}$ is obtained (step 30, FIG. 4). The digitized image pixel value is then compare to the threshold, $T_{i,j}$ (step 40, FIG. 4). If the pixel value is greater than or equal to the threshold $T_{i,j}$, the binarized pixel value is set equal to 1 (step 50, FIG. 4). If the pixel value is less than the threshold, the binarized pixel value is set equal to zero (step 60, FIG. 4).

It should be apparent that other embodiments of the threshold comparison step could be used. The binarized pixel value could be set to 1 when the pixel value is greater than the threshold $T_{i,j}$, and to zero otherwise. Similarly, the binarized pixel value could be inverted (applying the logical NOT function) resulting in the logical opposite of the embodiment described above.

In one embodiment of this invention, the filter used is a directional filter. In a specific embodiment, the directional filter used is a constant multiple of a Sobel filter. For a Sobel filter having n=1, in the horizontal mode, $h_{i,j}$, is given by $$h_{i,j} = \begin{matrix} 1 & 2 & 1 \\ 0 & 0 & 0 \\ -1 & -2 & -1 \end{matrix}$$

and, in the vertical mode, $h_{i,j}$ is given by $$h_{i,j} = \begin{matrix} 1 & 0 & -1 \\ 2 & 0 & -2 \\ 1 & 0 & -1 \end{matrix}$$

(See, for example, R. C. Gonzalez, P. Wintz, *Digital Image Processing*, ISBN 0-201-02597-3, 1977, pp. 337–38).

In one embodiment, the filter used is four times the Sobel filter and, in the horizontal mode, $h_{i,j}$ is given by $$h_{i,j} = \begin{matrix} 4 & 8 & 4 \\ 0 & 0 & 0 \\ -4 & -8 & -4 \end{matrix}$$

and in the vertical mode, $h_{i,j}$ is given by $$h_{i,j} = \begin{matrix} 4 & 0 & -4 \\ 8 & 0 & -8 \\ 4 & 0 & -4 \end{matrix}$$

Figure 5:
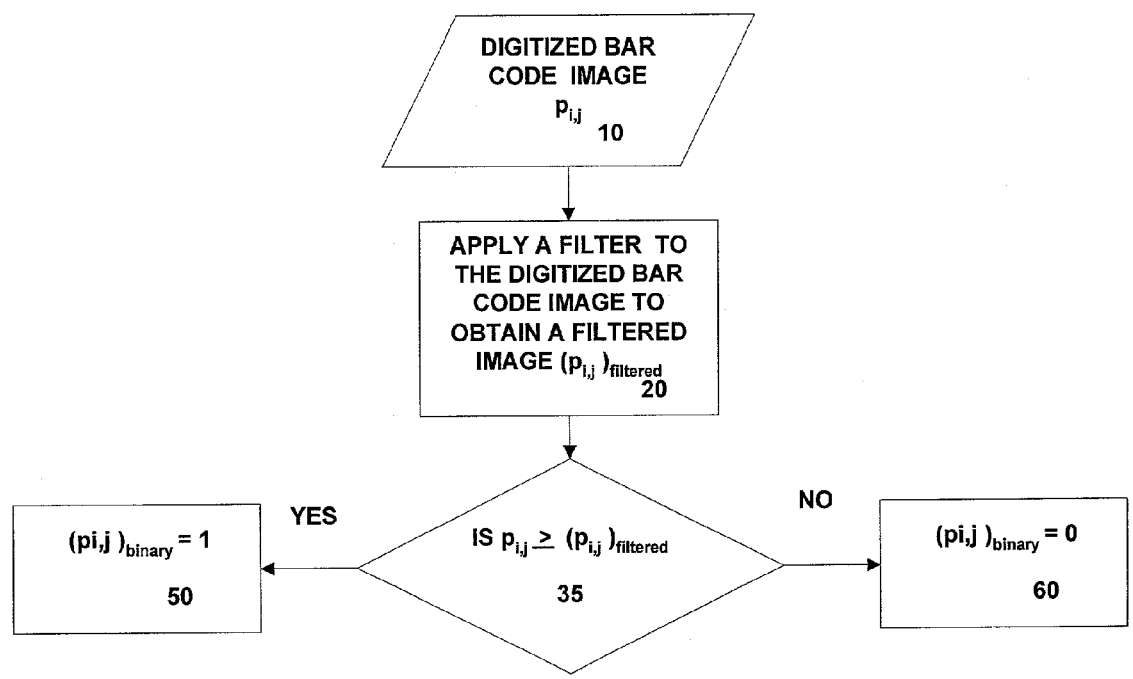
FIG. 5 is a flow chart representative of a detailed embodiment of the method of this invention.

A flow chart representative of a detailed embodiment of the method of this invention is shown in FIG. 5. Referring to FIG. 5, the threshold is selected equal to the filtered image pixel value, $(p_{i,j})_{filtered}$ (step 35, FIG. 5).

Figure 6:
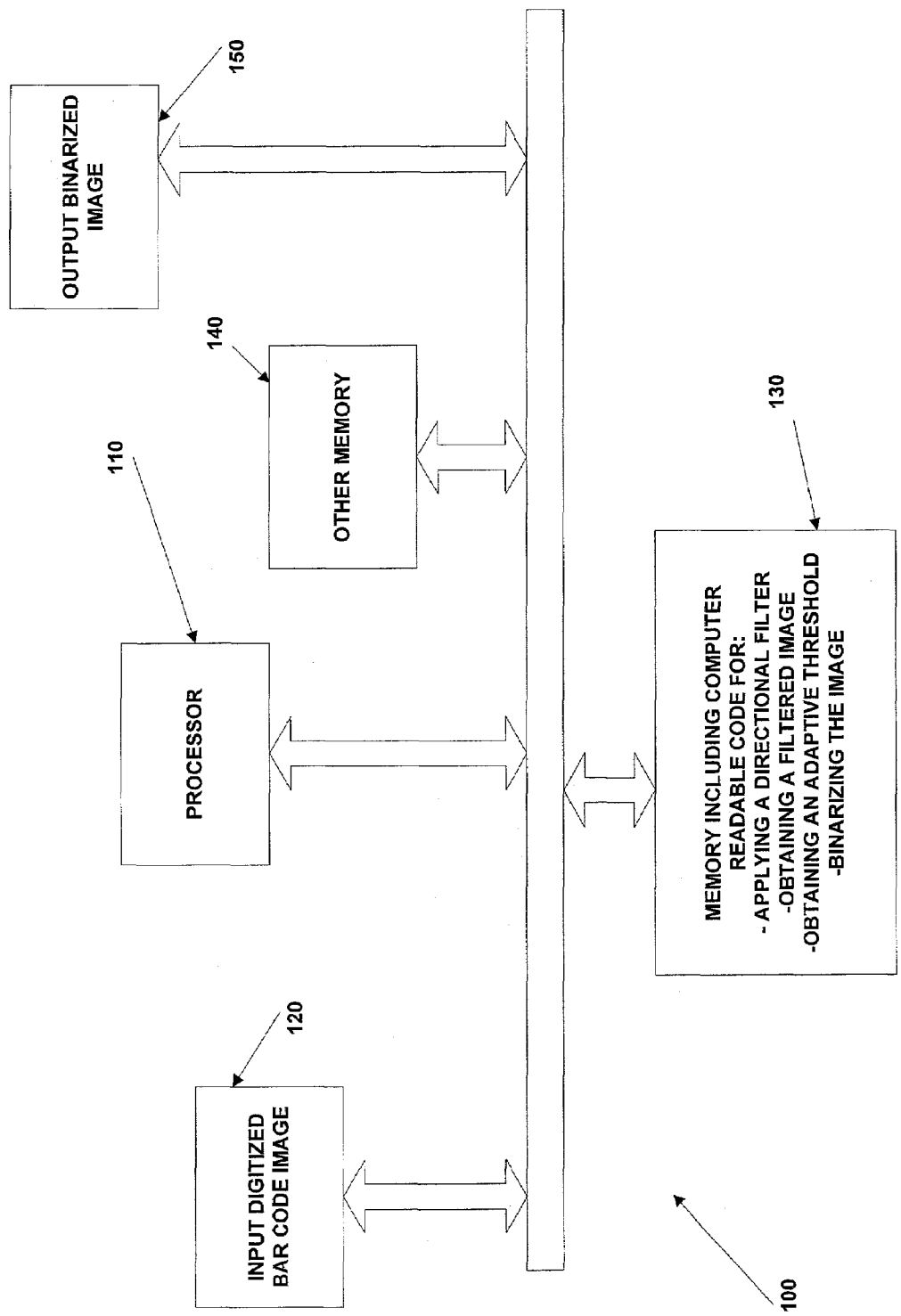
FIG. 6 is a block diagram representative of an embodiment of the system of this invention.
Figure 7:
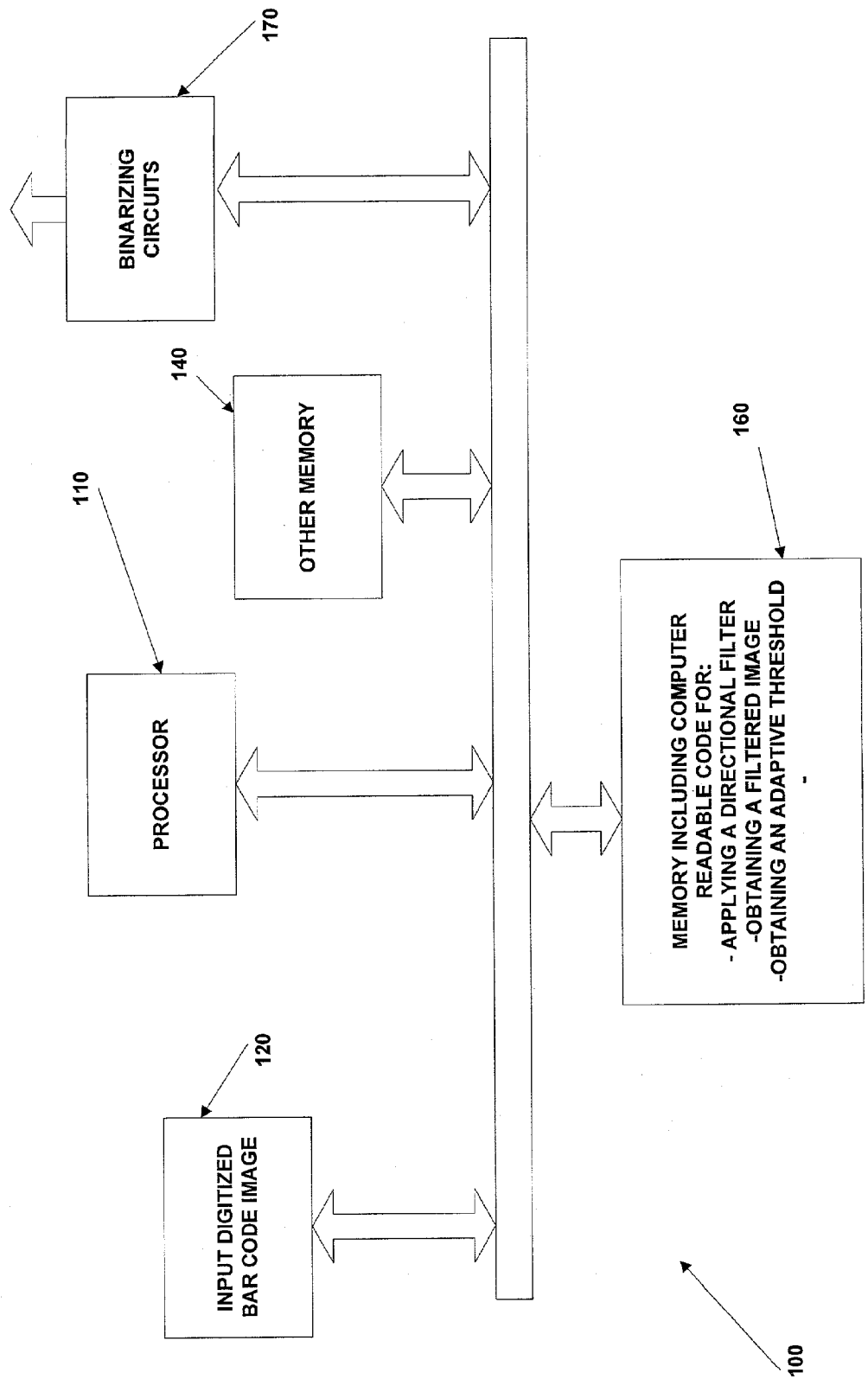
FIG. 7 is a block diagram representative of another embodiment of the system of this invention.

The method of this invention can be implemented by a system 100 (FIG. 6) comprising means for calculating the filtered image and means for determining the binarization. Referring to FIG. 6, a processor 110 and supporting memory 130 could be used to implement the method of this invention. Processor 110 can be a dedicated processor, or a digital signal processor, or a general purpose processor and supporting memory 130 could be any computer readable memory. The processor and memory systems and the code to cause the processor to implement the methods of this invention constitute means for applying the directional filter to the digitized bar code image and means for binarizing the digitized bar code image. In another embodiment, shown in FIG. 7, any of the previously described processor and memory systems could be used to implement the filtering operation and the determining of the adaptive threshold and a dedicated binarization circuit 170 could be used to implement the binarization operation. For example, the operation of comparing the digitized bar code image value to the filtered image pixel value at each pixel could be implemented by means of digital circuits.

Figure 1C:
FIG. 1C depicts the binarized image obtained using an embodiment of a binarization algorithm of this invention.
Figure 2C:
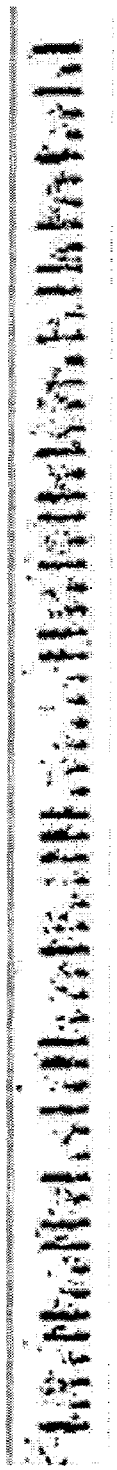
FIG. 2C depicts the binarized image, corresponding to second bar code image, obtained using an embodiment of a binarization algorithm of this invention.

The results obtained by applying the method of this invention to bar codes in the presence of noise, such as the noise caused by ink smearing, can be seen from FIGS. 1A, 1C, 2A, 2C. FIG. 1A depicts an original bar code image under the presence of noise. FIG. 1C depicts the binarized image obtained from the image of FIG. 1A using the method and system of this invention described above in which a vertical mode filter equal to four times the Sobel filter is used. Similarly, FIG. 2A depicts another original bar code image under the presence of noise. FIG. 2C depicts the binarized image obtained from the image of FIG. 2A using the method and system of this invention described above.

While the detailed embodiment of this invention has been described in terms of a filter that is a multiple of a Sobel filter it should be apparent that any edge detecting filter (or any directional filter), could be used and that a gradient filter could be used. Similarly, while the detailed embodiment of this invention has been described in terms of an adaptive threshold equal to the filtered image pixel value, it should be apparent that other functions of the filtered image pixel values could be used.

In general, the techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to data entered using the input device to perform the functions described and to generate output information. The output information may be applied to one or more output devices.

Elements and components described herein may be further divided into additional components or joined together to form fewer components for performing the same functions.

Each computer program within the scope of the claims below may be implemented in any programming language, such as assembly language, machine language, a high-level procedural programming language, or an object-oriented programming language. The programming language may be a compiled or interpreted programming language.

Each computer program may be implemented in a computer program product tangibly embodied in a computer-readable storage device for execution by a computer processor. Method steps of the invention may be performed by a computer processor executing a program tangibly embodied on a computer-readable medium to perform functions of the invention by operating on input and generating output.

Common forms of computer-readable media include, for example, a floppy disk, a flexible disk, hard disk, magnetic tape, or any other magnetic medium, a CDROM, any other optical medium, punched cards, paper tape, any other physical medium with patterns of holes, a RAM, a PROM, and EPROM, a FLASH-EPROM, any other memory chip or cartridge, a carrier wave, or any other medium from which a computer can read.

Although the invention has been described with respect to various embodiments, it should be realized this invention is also capable of a wide variety of further and other embodiments within the spirit and scope of the appended claims.

What is claimed is:

1. A method for decoding a bar code image in the presence of noise, the bar code image being a digitized image comprising pixels, each of said pixels having a corresponding digitized bar code image value, said method comprising the steps of:
    applying a gradient detecting filter to the digitized bar code image values;
    obtaining a filtered image comprising filtered image pixels, each of the filtered image pixels having a corresponding filtered image pixel value;
    adaptively binarizing the digitized bar code image value by utilizing said filtered image pixel value to obtain an adaptive threshold.

2. The method of claim 1 wherein the gradient detecting filter comprises a directional filter.

3. The method of claim 2 wherein the directional filter comprises a Sobel filter times a constant.

4. The method of claim 1 wherein the step of adaptively binarizing the digitized bar code image value further comprises the step of comparing the digitized bar code image value to the filtered image pixel value at each of said pixels.

5. A system for decoding a bar code image in the presence of noise, the bar code image being a digitized image comprising pixels, each of the pixels having a corresponding digitized bar code image value, said system comprising:
    means for applying a gradient detecting filter to the digitized bar code image, obtaining a filtered image comprised of filtered image pixels, each said filtered image pixels having a corresponding filtered image pixel value;
    means for adaptively binarizing the digitized bar code image utilizing the filtered image pixel value to obtain an adaptive threshold.

6. The system of claim 5 wherein the gradient detecting filter comprises a directional filter.

7. The system of claim 6 wherein the directional filter comprises a Sobel filter times a constant.

8. The system of claim 5 wherein the means for adaptively binarizing the digitized bar code image value further comprise means for comparing the digitized bar code image value to the filtered image pixel value at each pixel.

9. A computer program product comprising:
    a computer usable medium having computer readable code embodied therein for decoding a bar code image in the presence of noise, said image being a digitized image comprising pixels, each said pixel having a corresponding digitized bar code image value, said code causing a computer system to:
    apply a gradient detecting filter to the digitized bar code image;
    obtain a filtered image comprised of filtered image pixels, each said filtered image pixels having a corresponding filtered image pixel value;
    adaptively binarize the digitized bar code image utilizing the filtered image pixel value to obtain an adapuve threshold.

10. The computer program product of claim 9 where, in the computer readable code that causes a computer system to apply a gradient detecting filter to the digitized bar code image, the gradient detecting filter comprises a directional filter.

11. The computer program product of claim 10 where, in the computer readable code that causes a computer system to apply a directional filter to the digitized bar code image, the directional filter comprises a Sobel filter times a constant.

12. The computer program product of claim 9 where, in the computer readable code that causes a computer system to adaptively binarize the digitized bar code image, further causes the computer system to compare the digitized bar code image value to the filtered image pixel value at each pixel.

13. The computer program product of claim 9 where, in the computer readable code that causes a computer system to apply a gradient detecting filter to the digitized bar code image, the gradient detecting filter comprises a two dimensional gradient detecting filter.

14. A binarized bar code image obtained from a digitized bar code image, the digitized bar code image being a digitized image comprising pixels, each of said pixels having a corresponding digitized bar code image value, by:
    applying a gradient detecting filter to the digitized bar code image values;
    obtaining a filtered image comprising filtered image pixels, each of the filtered image pixels having a corresponding filtered image pixel value;
    adaptively binarizing the digitized bar code image value by utilizing said filtered image pixel value to obtain an adaptive threshold;
    whereby said binarized bar code image is easily decoded in the presence of noise.

15. The binarized bar code image of claim 13 wherein said gradient detecting filter comprises a directional filter.

16. The binarized bar code image of claim 14 wherein the gradient detecting filter comprises a Sobel filter times a constant.

17. The binarized bar code image of claim 14 wherein the step of adaptively binarizing the digitized bar code image value further comprises the step of comparing the digitized bar code image value to the filtered image pixel value at each of said pixels.

18. The binarized bar code image of claim 14 wherein said gradient detecting filter comprises a two dimensional gradient filter.

19. A method for decoding a bar code image in the presence of noise, the bar code image being a digitized image comprising pixels, each of said pixels having a corresponding digitized bar code image value, said method comprising the steps of:
    applying a two dimensional gradient detecting filter to the digitized bar code image values;
    obtaining a filtered image comprising filtered image pixels, each of the filtered image pixels having a corresponding filtered image pixel value;
    adaptively binarizing the digitized bar code image value by utilizing said filtered image pixel value to obtain an adaptive threshold.

20. The method of claim 19 wherein the two dimensional gradient detecting filter comprises a directional filter.

21. The method of claim 20 wherein the two dimensional directional filter comprises a Sobel filter times a constant.

22. The method of claim 19 wherein the step of adaptively binarizing the digitized bar code image value further comprises the step of comparing the digitized bar code image value to the filtered image pixel value at each of said pixels.

23. A system for decoding a bar code image in the presence of noise, the bar code image being a digitized image comprising pixels, each of the pixels having a corresponding digitized bar code image value, said system comprising:

means for applying a two dimensional gradient detecting filter to the digitized bar code image, obtaining a filtered image comprised of filtered image pixels, each said filtered image pixels having a corresponding filtered image pixel value;

means for adaptively binarizing the digitized bar code image utilizing the filtered image pixel value to obtain an adaptive threshold.

24. The system of claim 23 wherein the two dimensional gradient detecting filter comprises a directional filter.

25. The system of claim 24 wherein the directional filter comprises a Sobel filter times a constant.

26. The system of claim 23 wherein the means for adaptively binarizing the digitized bar code image value further comprise means for comparing the digitized bar code image value to the filtered image pixel value at each pixel.

* * * * *